US 9,165,533 B2

(12) United States Patent
Paulson

(10) Patent No.: US 9,165,533 B2
(45) Date of Patent: Oct. 20, 2015

(54) DISPLAY ROTATION MANAGEMENT

(71) Applicant: Microsoft Corporation, Redmond, WA (US)

(72) Inventor: Kevin P. Paulson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 13/911,368

(22) Filed: Jun. 6, 2013

(65) Prior Publication Data
US 2014/0362117 A1 Dec. 11, 2014

(51) Int. Cl.
G09G 5/00 (2006.01)
G09G 5/32 (2006.01)
G06F 1/16 (2006.01)
G06F 3/01 (2006.01)

(52) U.S. Cl.
CPC .............. *G09G 5/32* (2013.01); *G06F 1/1694* (2013.01); *G06F 3/017* (2013.01); *G06F 2200/1637* (2013.01); *H04M 2250/12* (2013.01)

(58) Field of Classification Search
None
See application file for complete search history.

(56) References Cited

U.S. PATENT DOCUMENTS

| | | |
|---|---|---|
| 2008/0259095 A1 | 10/2008 | Dubs et al. |
| 2010/0171691 A1 | 7/2010 | Cook et al. |
| 2011/0102451 A1 | 5/2011 | Broga et al. |
| 2011/0264928 A1 | 10/2011 | Hinckley |
| 2012/0053890 A1 | 3/2012 | Van Acht et al. |
| 2012/0068923 A1 | 3/2012 | Tashiro |
| 2012/0136573 A1* | 5/2012 | Janardhanan et al. ........ 701/512 |
| 2012/0254809 A1 | 10/2012 | Yang et al. |
| 2012/0320053 A1 | 12/2012 | Miyatani |
| 2013/0090881 A1* | 4/2013 | Janardhanan et al. ........ 702/104 |
| 2013/0124127 A1* | 5/2013 | Ahuja et al. .................... 702/86 |
| 2013/0328935 A1* | 12/2013 | Tu ................................. 345/651 |
| 2014/0184502 A1* | 7/2014 | Liu ............................... 345/158 |

FOREIGN PATENT DOCUMENTS

EP 2343626 A2 7/2011
WO 2013/184997 A2 12/2013

OTHER PUBLICATIONS

"Invitation to Pay Additional Fees and Partial International Search Report for PCT Patent Application No. PCT/US2013/060496", Mailed Date: Feb. 12, 2014, Filed Date: Sep. 19, 2013, 5 Pages.
"Screen Rotation and Device Orientation", Retrieved at <<http://www.kionix.com/sites/default/files/AN011%20Screen%20Rotation.pdf>>, May 21, 2007, pp. 6.
(Continued)

*Primary Examiner* — M Good Johnson
(74) *Attorney, Agent, or Firm* — Aneesh Mehta; Kate Drakos; Micky Minhas

(57) ABSTRACT

Display rotation management is described. A device may include sensors disposed within a housing that produce an output usable to determine an orientation of a display device disposed on a surface of the housing. A rotation manager module disposed within the housing may process the output of the sensors to determine the orientation of the display device. The rotation manager module may calculate an average orientation of the display device over a time interval and a variance of the orientation. Based on the variance of the orientation in relation to a threshold amount, the rotation manager module can set a screen orientation of the display device.

19 Claims, 5 Drawing Sheets

(56) References Cited

OTHER PUBLICATIONS

Surapa, Thiemjarus, "A Device-Orientation Independent Method for Activity Recognition", Retrieved at <<http://ieeexplore.ieee.org/stamp/stamp.jsp?tp=&arnumber=5504723>>, In International Conference on Body Sensor Networks, Jun. 7, 2010, pp. 5.

"Second Written Opinion", Application No. PCT/US2013/060496, Apr. 30, 2015, 9 Pages.

* cited by examiner

DISPLAY ROTATION MANAGEMENT

BACKGROUND

Users have access to computing devices that may assume a wide variety of configurations. For example, the first computing devices that were traditionally available to common users were configured as desktop personal computers. Users typically interacted with these computing devices using a keyboard and later a mouse to view data on a monitor.

Computing devices continued to evolve as users desired to interact with the devices in an increasing variety of circumstances. One such example was mobile phones that evolved from basic telephone functionality to the ability to run applications. Another such example is a slate computer, which may also be referred to as a tablet. Both of these examples are configured to be held by a user during interaction.

Because users hold these computing devices, a user may be able to easily change a device's orientation during interaction. Moreover, some orientations of a computing device may be more suitable for viewing particular content than other orientations. For example, it may be desirable to view some content with a computing device held vertically (e.g., a document) and desirable to view other content with the computing device held horizontally, e.g., a movie. Consequently, many computing devices have been configured to change a screen orientation to follow an orientation of the computing device. Sometimes, however, changing the screen orientation to match a computing device's orientation may be undesirable or annoying, such as when a user accidentally rotates the device or hands the device to another user, during quick movements of the user, and so on.

SUMMARY

Display rotation management techniques are described. In one or more implementations, sensors are disposed within a device housing. The sensors are configured to produce an output that is usable to determine an orientation of a display device disposed on a surface of the housing. A rotation manager module disposed within the housing is configured to process the output of the sensors to determine the orientation of the display device. The rotation manager module may be configured to calculate an average orientation of the display device over a time interval. Additionally, the rotation manager module may be configured to calculate a variance of the orientation over the time interval. Based on the variance of the orientation in relation to a threshold amount, the rotation manager module is configured to set a screen orientation of the display device.

In one or more implementations, a change in orientation of a device is detected using sensors that are configured to produce output that is usable to determine the orientation of the device. At multiple points over a time interval, output from the sensors is collected to determine the orientation of the device. Using the determined orientation corresponding to each of the multiple points over the time interval, an average orientation of the device and a variance of the orientation over the time interval may be computed. A screen orientation for displaying content on the device may be set based on the average orientation of the device. When the screen orientation does not correspond to the average device orientation and the computed variance for the time interval is less than a threshold amount, the screen orientation may be rotated. For instance, the screen orientation may be rotated to one of a portrait orientation or a landscape orientation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
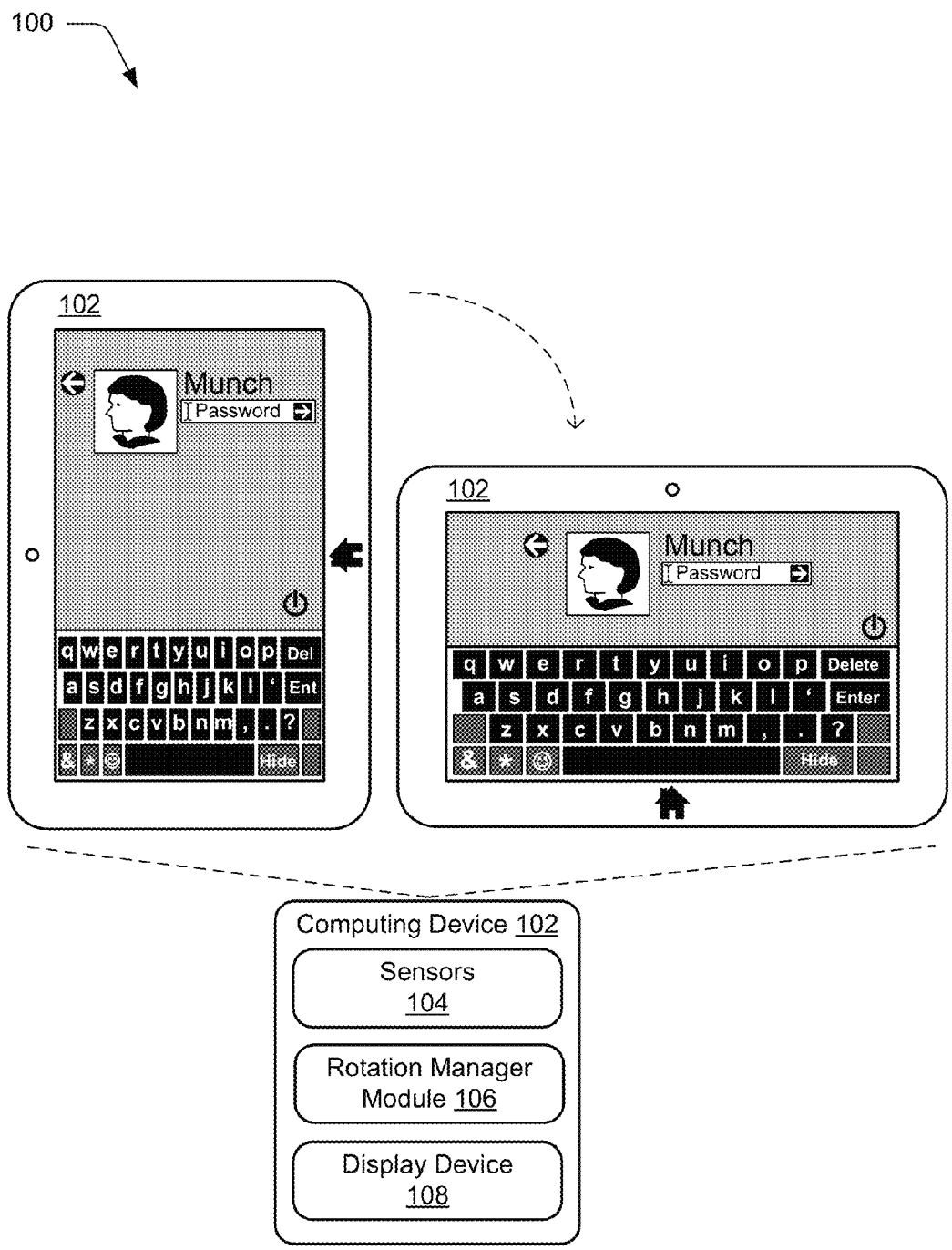
FIG. 1 is an illustration of an environment in an example implementation that is operable to employ display rotation management as described herein.

The diversity of computing devices with which a user interacts in a typical day is growing rapidly. In particular, the pervasiveness of handheld devices has increased as users desire to interact with the devices in a variety of circumstances. However, conventional techniques for managing how content is displayed on handheld devices may have some undesirable side effects. For example, conventional computing devices may be configured to rotate content displayed on a display device to match an orientation of the display device. However, conventional display management techniques may perform these rotations even when a user does not intend for the content to be rotated, such as when the user hands the computing device to another user, may respond to shaking of the device, and so on.

Display rotation management is described. In one or more implementations, a device includes a housing according to a mobile form factor. Sensors may be disposed within the housing of the device. The sensors may produce output usable for determining an orientation of a display device disposed on the housing. Based on orientation data collected over a particular time interval, a rotation manager module disposed within the housing may determine whether to change a screen orientation of the display device or have the orientation remain the same. Thus, the rotation manager module may be configured to prevent undesirable rotations of the content displayed by the display device that may interfere with a user's enjoyment of the device, such as by waiting until the device is held substantially steady to make the change.

The determination of when to change the orientation may be performed in a variety of ways. For example, the rotation manager module may be configured to calculate an average orientation of the device and a variance of the orientation using multiple points of orientation data collected over a time interval. Based on a comparison of the variance to a threshold amount, the rotation manager module may determine to rotate a screen orientation to correspond to an orientation of the device. For example, if the variance is less than the threshold amount (i.e., the orientation data for a time interval indicates little variance of the device's orientation over the time interval), the rotation manager module may change the screen orientation. However, if the variance is greater than the threshold amount (i.e., the orientation data for the time interval indicates too much variance of the device's orientation over the time interval), the rotation manager module may maintain the screen orientation without change. Instead, the rotation manager module may wait to rotate the screen orientation until the device is substantially steady, i.e., the variance is less than the threshold amount.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes an example of a computing device 102 having sensors 104, a rotation manager module 106, and a display device 108. The computing device may include a housing configured according to a mobile form factor and thus may be gripped by one or more hands of a user. The rotation manager module 106 and the sensors 104 may be disposed within the housing. The display device 108 may be disposed on a surface of the housing such that the display device 108 is viewable by a user.

The computing device 102 may be configured in a variety of ways. Examples of configurations that may include device rotation management can be found in desktop and laptop computers, table-top computers, mobile phones, tablet computers, portable game devices, music players, augmented reality devices, and so on. Thus, the computing device 102 may range from full resource devices with substantial memory and processor resources to low-resource devices with limited memory and/or processing resources.

The sensors 104 may be configured to produce an output that is usable to determine an orientation of the display device 108. The sensors 104 represent different types of sensors that may be employed, alone or in combinations, to track manipulation of the computing device 102. For instance, the sensors 104 may be used to track an orientation of the display device 108 relative to the ground, e.g., based on gravity. Specifically, the sensors 104 may track the orientation of the display device 108 in three-dimensions (3D) as a user manually manipulates the computing device 102. To do so, the sensors 104 may be employed to track the orientation of the computing device 102 along each of a horizontal (x), a vertical (y), and a rotational (z) axis.

Accordingly, a screen orientation may be set and adjusted based on vertical, horizontal, and rotational changes to the orientation of the computing device 102. The orientation tracking enables determination of a screen orientation with which content is to be displayed on the display device 108. The sensors 104 may be configured in a variety of ways to perform device orientation tracking Examples of sensors 104 suitable to perform device orientation tracking include a camera, a gyroscope, a distance sensor, and a 3D accelerometer, inertial sensors, and so on.

As noted above, the sensors 104 may be configured to produce an output that is usable to determine an orientation of the display device 108. In one or more implementations, the sensors 104 may be configured to detect a change in orientation of the device and provide output from which the orientation of the display device 108 may be determined. A sensor service, for instance, may monitor the sensors 104 for sensor events. The sensor service may be configured to derive orientation data from the output of the sensors, e.g., the sensor events. In one or more implementations, the sensor service may provide the orientation data to the rotation manager module 106. In other implementations, the sensor service may be included as part of the rotation manager module 106.

The rotation manager module 106 may be configured to process output of the sensors 104 to determine a likely orientation of the display device 108. For example, the rotation manager module 106 may process the output of the sensors 104 and determine that the computing device 102 is likely oriented vertically, such as when the computing device is held vertically. In another example, the rotation manager module 106 may process the output of the sensors 104 and determine that the computing device 102 is oriented horizontally, such as when the computing device 102 is held horizontally to view a movie.

The rotation manager module 106 is configured to set the screen orientation of the display device 108, e.g., to a landscape orientation or a portrait orientation although other orientations are also contemplated. In FIG. 1, two examples of the computing device 102 are illustrated; one in which the screen orientation is set to a portrait orientation and another in which the screen orientation is set to a landscape orientation. In the example where the screen orientation is set to the portrait orientation, the computing device 102 may be held vertically by a user. In the example where the screen orientation is set to the landscape orientation, the computing device 102 may be held horizontally by a user.

Although the rotation manager module 106 is configured to set the screen orientation of the display device 108, changing the screen orientation from one orientation to another may be undesirable in some instances. For example, switching the screen orientation may be undesirable when the computing device 102 is not held substantially steady which may cause the orientation to "jump back and forth." It may also be undesirable to rotate the content displayed on the display device 108, for instance, while the computing device 102 is being shaken, handed from one user to another, rotated quickly from one orientation to another and back again, and so on.

It may also be undesirable to rotate content displayed on the display device 108 when the computing device 102 is partially rotated. The computing device 102, for example, may be held at an angle between the two examples illustrated in FIG. 1, e.g., at 45 degrees. However, rotating the content displayed on the screen from a current screen orientation may not be desirable in such a situation.

Accordingly, the rotation manager module 106 may be configured to prevent undesirable rotations of the content displayed by the display device 108. To do so, the rotation manager module 106 may wait to change a screen orientation until the computing device 102 is substantially steady, e.g., encounters minimal changes in orientation. The rotation manager module 106 may thus be configured to determine whether the computing device 102 is substantially steady based on how much the orientation of the computing device varies over a given time interval.

To determine how much the orientation of the computing device 102 varies over a given time interval, the rotation manager module 106 computes an average orientation of the computing device 102 and a variance of the orientation for the time interval. For example, responsive to the orientation change, output from the sensors 104 may be collected at multiple points over the time interval to determine an orientation of the computing device 102 at each of the multiple points.

Using the multiple points of orientation data collected for the time interval, the rotation manager module 106 can compute the average orientation of the computing device 102. For example, the output from the sensors 104 may be collected at seven points over a 250 millisecond time interval. Thus, the time interval may have seven corresponding data points that each indicates an orientation of the device at the time the output was collected. Consequently, the average orientation of the computing device 102 for the time interval may be computed using the orientation data associated with the seven data points. Although collecting data at seven points over the interval is discussed, data may be collected for more or fewer than seven points. Additionally, the time interval with which the multiple points are associated may be shorter or longer than 250 milliseconds.

In any case, the rotation manager module 106 may be configured to calculate the average orientation using a variety of methods. For example, the rotation manager module 106 may calculate the average orientation by taking a mean, median, or mode of the multiple data points. Other techniques for calculating an average may be used without departing from the spirit and the scope of the techniques described herein.

As discussed above, the rotation manager module 106 is also configured to calculate a variance of the orientation over the time interval. The rotation manger module 106, for instance, can calculate a variance using the orientation data associated with the multiple data points of the time interval. In one or more implementations, the rotation manager module 106 may calculate a standard deviation of the device orientation over the multiple data points. The rotation manager module 106 may then use the standard deviation as a basis for determining whether the computing device 102 is substantially steady. Alternately or additionally, the rotation manager module 106 may calculate one or more other descriptors for the multiple points of orientation data, including statistical variance (e.g., the mean of equally likely squared deviations), the root mean square deviation, and the like.

The rotation manager module 106 is configured to compare the variance of the orientation data to a threshold amount to determine whether the device is considered "steady." The threshold amount, for instance, may represent an angular tolerance. The angular tolerance may correspond to a range of angles, such that if the multiple points of orientation data for a time interval fall within that range, the device may be considered to be steady for that time interval.

For example, the angular tolerance may correspond to a six-degree range. With an angular tolerance of six degrees, data points collected over a time interval indicating orientations of 90°, 91°, 92°, 93°, 91.5°, 90.5°, and 92° would fall within the range. Accordingly, the computing device 102 may be determined to be steady over the time interval. However, if data points were collected over the time interval indicating orientations of 90°, 180°, 181°, 0°, 5°, 90°, and 91.5°, such data points would not fall within the six-degree range. Thus, the computing device 102 may be determined not to be steady over the time interval. Although an angular tolerance of six degrees is discussed, other threshold values and types may be chosen without departing from the spirit and scope of the techniques described herein.

Regarding the comparison, the rotation manager module 106 may determine that the computing device 102 is steady if the computed variance is less than the threshold amount. When the variance is less than the threshold amount, the rotation manager module 106 may be configured to change the screen orientation if it does not already correspond to the average orientation of the display device 108. On the other hand, if the computed variance is greater than the threshold amount, the rotation manager module 106 may consider the computing device 102 to be unsteady. Consequently, when the variance is greater than the threshold amount, the rotation manager module 106 may be configured to leave the current screen orientation "as is," even though the screen orientation may not currently correspond to the average orientation of the display device 108. In this way, rotation of the screen may be prevented while the computing device 102 is in motion.

When the computing device 102 is determined to be unsteady over a time interval (i.e., the variance is greater than the threshold amount), multiple points may be collected and the average orientation and variance calculated for an additional time interval. As before, the rotation manger module 106 is configured to compute the average orientation of the computing device 102 and variance for the additional time interval. The rotation manager module 106 does so when the orientation of the computing device is determined to be unsteady over the previous time interval. The calculations may be performed for the additional time interval in a similar fashion as those performed for the preceding time interval. However, the calculations for the additional time interval may be performed using orientation data collected at multiple points over that interval.

Using the average orientation and variance of the additional time interval, the rotation manager module 106 can determine whether the computing device 102 is steady over the additional time interval. The rotation manager module 106 is configured to change the screen orientation if the computing device 102 is determined to be steady over the additional time interval and the screen orientation does not correspond to the average device orientation. If the computing device 102 is determined not to be steady, orientation data may be collected and average orientation and variance computed for other additional time intervals. Thus, the rotation manager module 106 may not change the screen orientation until the computing device 102 is determined to be steady (i.e., the variance is less than the threshold amount) over one time interval.

Figure 2:
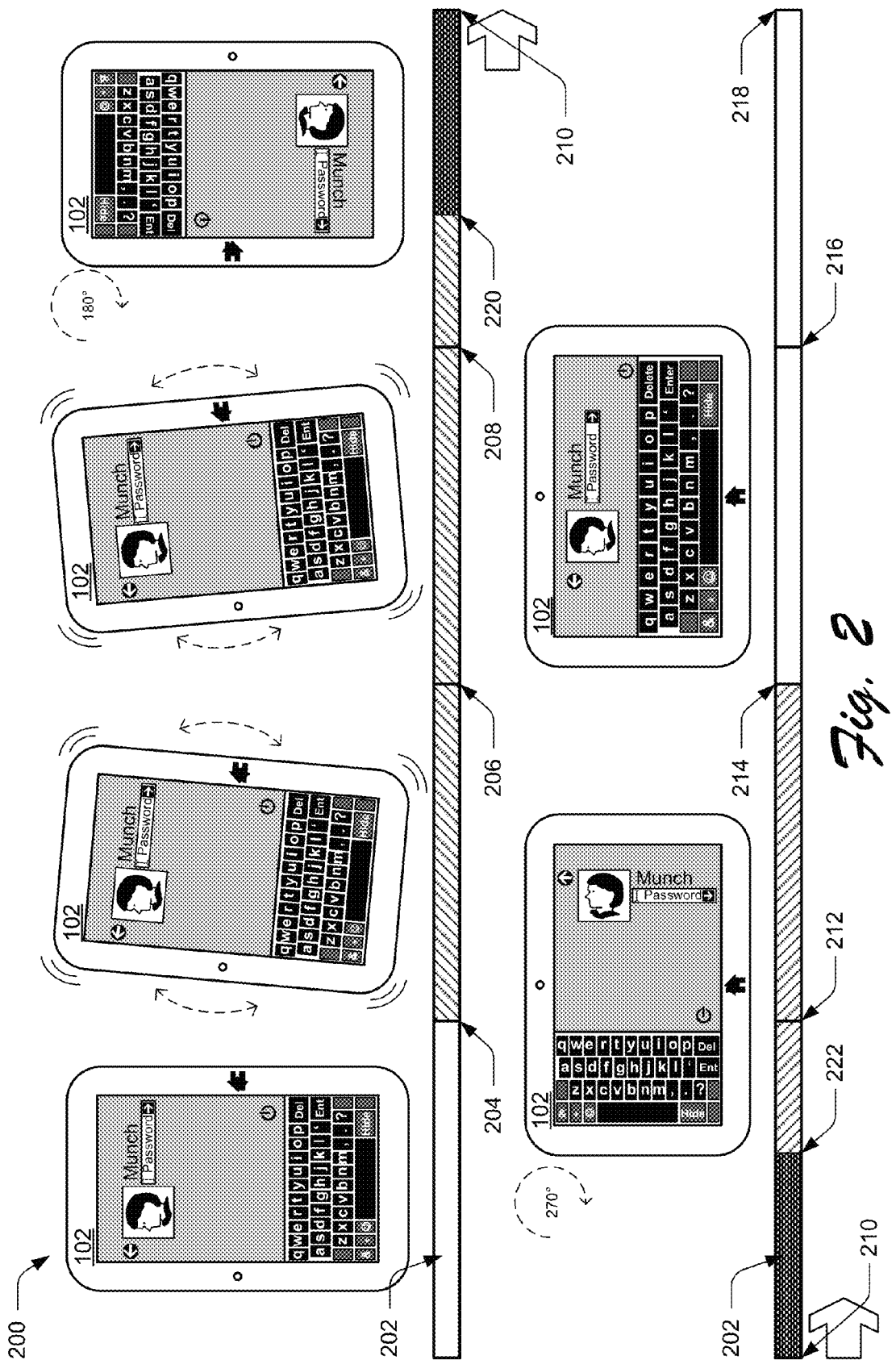
FIG. 2 depicts an example implementation in which a device implementing display rotation management techniques is moved through various positions over time.

FIG. 2 depicts an example implementation 200 in which a device implementing display rotation management techniques is moved through various positions over time. In particular, FIG. 2 depicts the computing device 102 in different positions and being moved with reference to a timeline 202. The timeline 202 starts in the upper left and time lapses from left to right and top to bottom. Accordingly, the upper-left depiction of the computing device 102 indicates its starting position and the lower-right depiction indicates its ending position.

In the illustrated example, the computing device 102 is depicted in the starting position as being vertically oriented. At the starting position, it is assumed that the computing device 102 is held in a relatively steady manner. At time 204 an orientation change of the device is detected. An orientation change of computing device 102, such as a one-degree rotation, may trigger a sensor event and the collection of data points. Responsive to the orientation change, output from the sensors 104 of the computing device 102 may be collected. The output may be used to determine the orientation of the computing device 102 for multiple points over the time interval spanning from time 204 to time 206. The interval between time 204 and time 206 may be 250 milliseconds. Time intervals between times 208, 210, 212, 214, 216, 218 may also correspond to 250-millisecond time intervals. Orientation data collected at points over these intervals may be associated with a respective interval during which the orientation data is collected.

In addition, a rate at which output from the sensors 104 is collected may be increased responsive to an orientation change. For example, prior to time 204 output may be collected from the sensors 104 at a given sampling rate. Responsive to the orientation change at time 204, however, the sampling rate may be increased to a high sampling rate. When the sampling rate is increased to the higher sampling rate, output from the sensors 104 is collected more frequently over an amount of time than with the given sampling rate. As an example, output may be collected from the sensors 104 once over a 250-millisecond time interval with the given sampling rate, but be collected seven times over a 250-millisecond interval when the high sampling rate is in effect.

Continuing with the example, the sampling rate may be increased beginning at time 204 for the corresponding time interval. Thus, between time 204 and time 206, output may be collected from the sensors 104 at the higher sampling rate. Beginning at time 204 and until time 220, computing device 102 is illustrated as being shaken or continuously rotated. In other words, the orientation of the device during this span of time is not substantially steady.

Between time 204 and time 206, output that is usable to determine an orientation of the computing device 102 may be collected from the sensors 104 at multiple points during that time interval. Once the time interval has lapsed (e.g., at time 206), the rotation manger module 106 may calculate an average orientation of the device and variance using the orientation data collected over the time interval. Because the device is being shaken over this time interval, the variance of the orientation for the time interval may be greater than the threshold amount (e.g., greater than an angular tolerance). Consequently, the orientation of the computing device 102 over the time interval between time 204 and time 206 may be determined to be unsteady. Based on this determination, the rotation manager module 106 is configured to maintain the current screen orientation without change, i.e., maintain the screen orientation with which content was displayed prior to time 204.

Because the orientation of the device is determined to be unsteady for the time interval between time 204 and time 206, data may be collected at the higher sampling rate again for the time interval spanning from time 206 to time 208. As noted above, the computing device 102 is illustrated as still being shaken or continuously rotated during this time interval. Accordingly, the output collected from the sensors 104 between time 206 and time 208 may result in a variance, calculated at time 208, that is greater than the threshold amount. It follows that the rotation manager module 106 is again configured to maintain the current screen orientation without change and to collect data at the higher sampling for yet another time interval.

During the interval spanning from time 208 to time 210, specifically at time 220, computing device 102 is illustrated as being rotated 180° from the starting position. Due to this rotation the output collected from sensors 104 between time 208 and time 210 may result in an orientation variance, calculated at time 210, that is also greater than the threshold amount. Accordingly, the rotation manager module 106 again maintains the current screen orientation, even though it appears to be upside down. In this way, a change in the screen orientation is prevented for situations in which the device is held in or moved to a position for only a short period of time.

Additionally, the rotation manager module 106 may be configured to skip intermediate screen rotations. In contrast, conventionally designed devices that are rotated 180°, may first rotate content displayed on such a device's screen by 90°, and then by the 180° to correspond to the device's orientation. In one or more implementations of display rotation management, however, such intermediate rotations may be prevented.

Output may again be collected from the sensors 104 at the higher sampling rate for the interval between times 210 and 212 because the variance of the preceding time interval exceeded the threshold amount. During this time interval, specifically at time 222, computing device 102 is illustrated as being rotated 270° in a clockwise direction from the position rotated to at time 220. Due to this rotation the output collected from the sensors 104 between time 210 and time 212 may result in an orientation variance, calculated at time 212, that is greater than the threshold amount. Accordingly, the rotation manager module 106 can again maintain the current screen orientation.

Between times 222 and 218, however, the computing device 102 is not rotated and is held substantially steady. Nonetheless, output is collected at the higher sampling rate for the interval between times 212 and 214 because the variance of the preceding time interval (e.g., between times 210 and 212) exceeded the threshold amount. Because the computing device 102 is not rotated and is held substantially steady, the orientation data collected between times 212 and 214 may result in a variance that is less than the threshold amount.

Once the variance is less than the threshold amount for a time interval, the rotation manager module 106 is configured to rotate the screen orientation to correspond to the device orientation. In the illustrated example, the screen orientation is rotated at time 214 from the portrait orientation, depicted for the positions prior to time 214, to a landscape orientation. Thus, the screen orientation may be matched to the orientation of the computing device 102 after the orientation is determined to be substantially steady.

In addition, once the computing device 102 is determined to be steady for a time interval, the sampling rate may be reduced from the higher sampling rate back to the given sampling rate. For example, once the computing device 102 is determined to be steady for the time interval between time 212 and time 214, output may again be collected from the sensors 104 using the given sampling rate. Thereafter, and until another orientation change of the computing device 102 is detected, the reduced sampling rate may be used to collect sensor output. In the illustrated example, the device is not depicted as being substantially moved after time 214. Accordingly, from time 214 to time 218, data may be collected from the sensors 104 at the given sampling rate and not the higher sampling rate.

Example Procedures

The following discussion describes display rotation management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example embodiment of FIG. 2.

Figure 3:
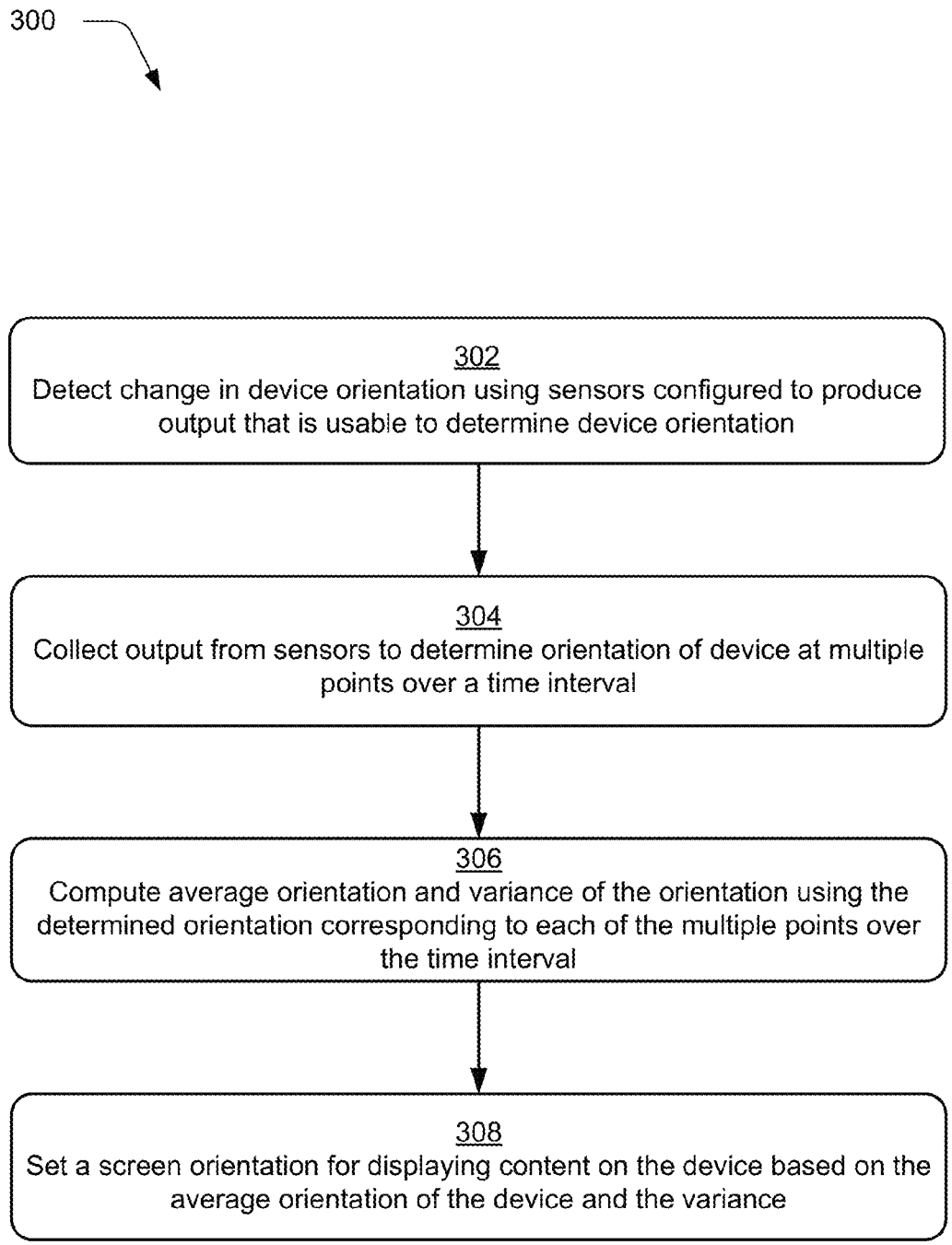
FIG. 3 is a flow diagram depicting a procedure in an example implementation in which a screen orientation for displaying content on a device is set based on an average orientation of the device and a variance of the device over a time interval.

FIG. 3 depicts a procedure 300 in an example implementation in which a screen orientation for displaying content on a device is set based on an average orientation of the device and a variance of the device over a time interval. A change in orientation of a device is detected using sensors configured to produce output that is usable to determine the orientation of the device (block 302). For example, a gyroscope may be employed to monitor orientation of the display device 108. In another example, an accelerometer may indicate changes in direction, velocity, and orientation of the display device 108. In yet another example, a camera is provided that may be used to detect and monitor orientation of the display device 108 with respect to a horizon or other reference object. For instance, the camera may detect when the viewer rotates the computing device 102 relative to the horizon or reference object. The camera may be used in a preview-hidden mode (e.g., the camera image is hidden rather than rendered on the display device 108) so that the activities of the viewer are not interrupted.

At multiple points over a time interval, output from the sensors is collected to determine the orientation of the device at the multiple points (block 304). For example, output from the sensors 104 of the computing device 102 may be collected at multiple points over a time interval, such as the time interval in FIG. 2 represented between time 204 and time 206.

Using the determined orientation corresponding to each of the multiple points over the time interval, an average orientation of the device and a variance of the orientation over the time interval may be calculated (block 306). For example, the rotation manager module 106 may calculate an average orientation of the computing device 102 and a variance of its orientation over the time interval between time 204 and time 206. To do so, the rotation manager module 106 may use orientation data from the multiple points at which sensor output was collected over that time interval.

A screen orientation for displaying content on the device may be set based on the average orientation of the device and the variance (block 308). For example, the rotation manager module 106 may determine at time 214 that the portrait screen orientation does not correspond to the horizontal orientation of the computing device 102. The rotation manage module 106 may also determine that the orientation of the computing device 102 over the interval between times 212 and 214 varies less than a threshold amount. As a result, the rotation manager module 106 may set the screen orientation to a landscape orientation to match the horizontal orientation of the computing device 102 at time 214.

Figure 4:
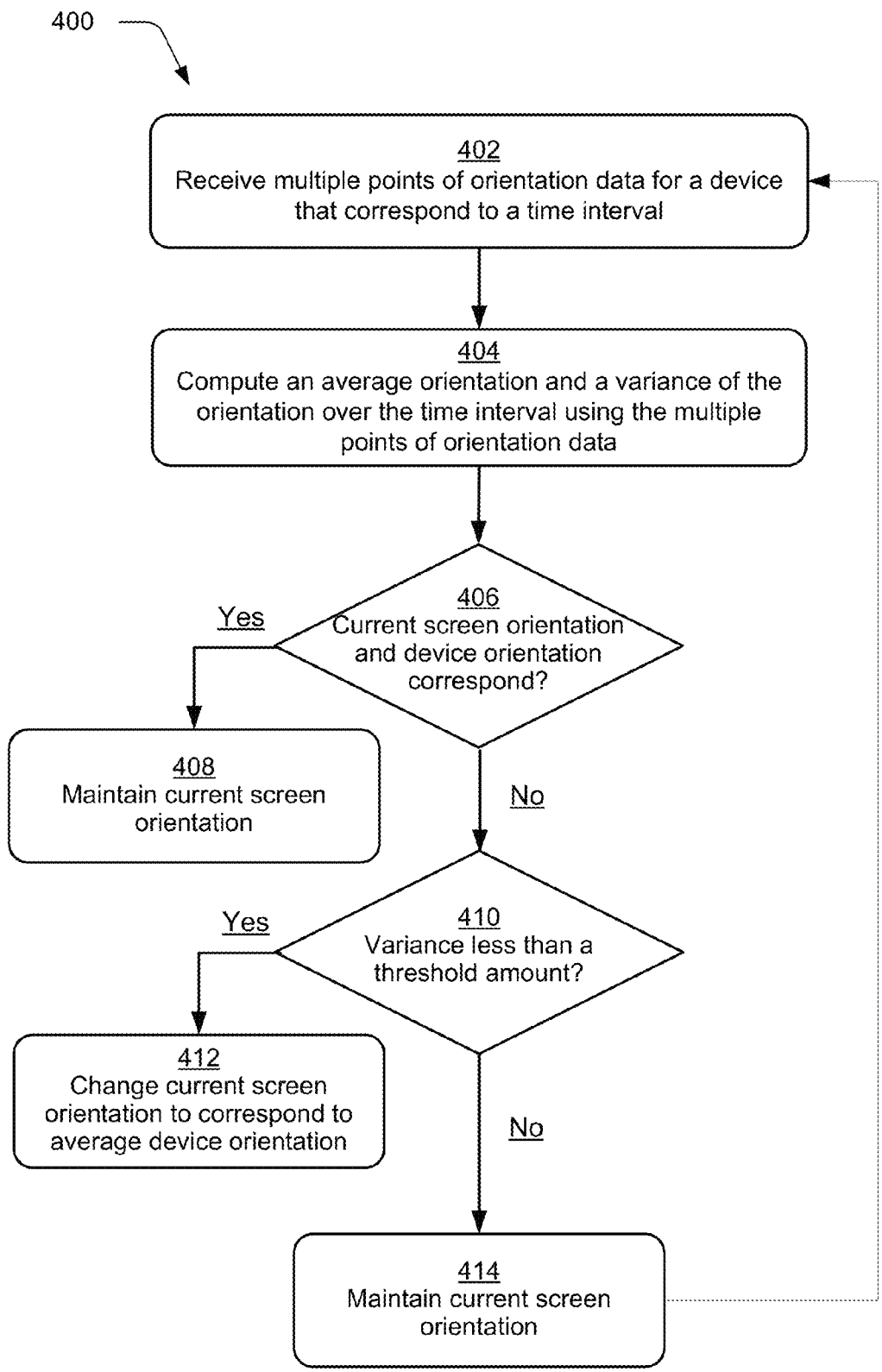
FIG. 4 is a flow diagram depicting a procedure in an example implementation in which a rotation manager module determines to maintain a current screen orientation or to change it to correspond to the average device orientation.

FIG. 4 depicts a procedure 400 in an example implementation in which a rotation manager module determines to maintain a current screen orientation or to change it to correspond to the average device orientation. Multiple points of orientation data are received that are derived from output of sensors and correspond to a time interval (block 402). For example, a sensor service may derive orientation data from output of the sensors 104 housed in the computing device 102. In one or more implementations, the rotation manager module 106 may then receive the orientation data from the sensor service. In other implementations, the rotation manager module 106 may derive orientation data from the output of the sensors 104. Further, the orientation data may correspond to any one of the time intervals between times 204, 206, 208, 210, 212, 214, 218. However, a point of orientation data may not correspond to more than one time interval.

Using the multiple points of orientation data, an average orientation of the device and a variance of the orientation over the time interval may be computed (block 404). For example, the rotation manager module 106 may calculate the average orientation of the computing device 102 and the variance of its orientation for the time interval between time 204 and time 206. To do so, the rotation manager module 106 may use the orientation data collected from the sensors 104 at multiple points between time 204 and time 206.

A determination is made as to whether the average orientation of the device over the time interval corresponds to a current screen orientation with which content is to be displayed on the device (block 406). For example, the rotation manager module 106 may determine whether the orientation of the computing device 102 at time 206 corresponds to the current screen orientation. If the average orientation of the device over the time interval corresponds to the current screen orientation (i.e., "yes" from block 406), then the current screen orientation is maintained without change (block 408). For example, the rotation manager module 106 may determine that the current screen orientation at time 206 does generally correspond to the orientation of the computing device 102 at time 206. Consequently, the current screen orientation may be maintained at time 206 without change regardless of whether the orientation of the computing device 102 varies more or less than the threshold amount.

If the average orientation of the device over the time interval does not correspond to the current screen orientation (i.e., "no" from block 406), a determination is made as to whether the variance computed for the time interval is less than a threshold amount (block 410). For example, the rotation manager module 106 may determine that the current screen orientation at time 214 does not correspond to the current screen orientation. Accordingly, the rotation manager module 106 may determine whether the variance computed for the time interval between time 212 and time 214 is less than a threshold amount. If the variance computed for the time interval is less than the threshold amount (i.e., "yes" from block 410), then the current screen orientation is changed to correspond to the average device orientation (block 412). For example, the rotation manager module 106 may determine that the variance computed for the time interval between time 212 and time 214 is less than a threshold amount. Consequently, at time 214 the rotation manager module 106 may change the screen orientation to a landscape orientation to match the horizontal orientation of the computing device 102.

If the variance computed for the time interval is greater than the threshold amount, however (i.e., "no" from block 410), then the current screen orientation is maintained without change (block 414). For example, the rotation manager module 106 may determine that the variance computed for the time interval between times 210 and 212 is greater than the threshold amount. Accordingly, at time 212 the rotation manager module 106 may maintain the screen orientation without change.

In addition, when it is determined that the computed variance is greater than the threshold amount, the procedure 400 may be repeated for an additional time interval using multiple points of orientation data corresponding to the additional time interval. In particular, multiple points of orientation data that are derived from output of the sensors over the additional time interval may be received, such as at block 402. Accordingly, an average orientation of the device and a variance of the orientation over the additional time interval may be computed using the multiple points of orientation associated with the additional time interval (e.g., as in at block 404). The determinations made at blocks 406 and 410 may made based on the average orientation of the device and the variance of the orientation computed for the additional interval. In this way, the screen orientation of the device may be maintained without change until a user stops moving the device and the device is substantially steady (i.e., until the orientation of the device varies less than the threshold amount over a time interval).

Example System

Figure 5:
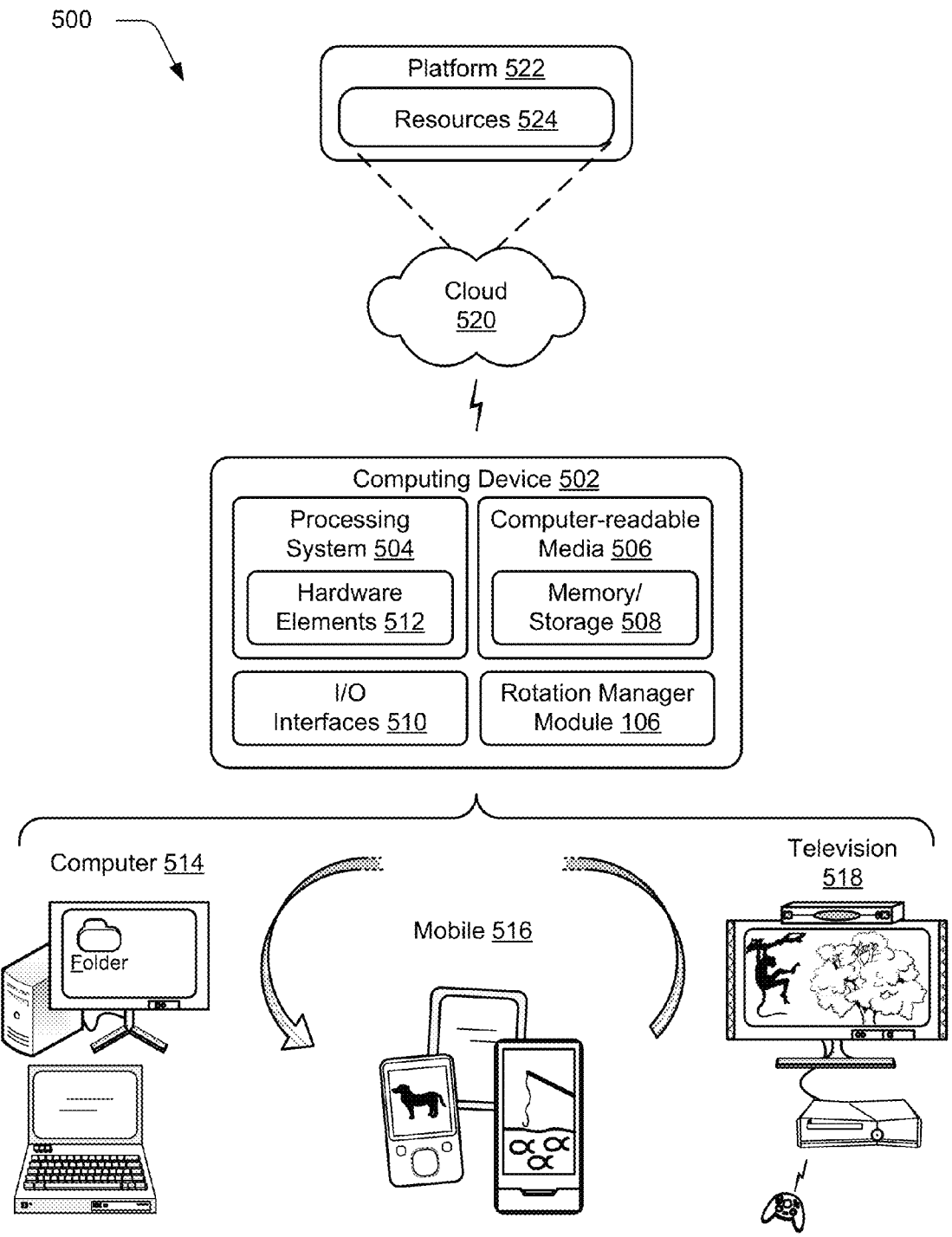
FIG. 5 illustrates various components of an example system that can be employed to implement aspects of the techniques described herein.

FIG. 5 illustrates an example system generally at 500 that includes an example computing device 502 that is representative of one or more computing systems and/or devices that may implement the various techniques described herein. The computing device 502 may, for example, be configured with sensors 104 and a rotation manager module 106. The rotation manager module 106 may be configured to manage when content displayed on a display device may be rotated.

The example computing device 502 includes a processing system 504 that may incorporate one or more processors or processing devices, one or more computer-readable media 506 which may include one or more memory and/or storage components 508, and one or more input/output (I/O) interfaces 510 for input/output (I/O) devices. Computer-readable media 506 and/or one or more I/O devices may be included as part of, or alternatively may be coupled to, the computing device 502. As illustrated, the processing system 504 may also include one or more hardware elements 512 representative of functionality to implement at least some aspects of the procedures and techniques described herein in hardware. Although not shown, the computing device 502 may further include a system bus or data transfer system that couples the various components one to another. A system bus can include any one or combination of different bus structures, such as a memory bus or memory controller, a peripheral bus, a universal serial bus, and/or a processor or local bus that utilizes any of a variety of bus architectures.

The processing system 504, processors, and hardware elements 512 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone (e.g., which may be configured to receive voice input), a scanner, touch functionality (e.g., capacitive or other sensors that are configured to detect physical touch), a camera (e.g., which may employ visible or non-visible wavelengths such as infrared frequencies to recognize movement as gestures), and so forth. Examples of output devices include a display device (e.g., a monitor or projector), speakers, a printer, a network card, tactile-response device, and so forth. Thus, the computing device 502 may be configured in a variety of ways to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media.

As previously described, hardware elements 512 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 512. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 512 of the processing system 504. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on. The techniques described herein may be supported by these various configurations of the computing device 502 and are not limited to the specific examples the techniques described herein.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of the functionality described herein may be distributed throughout the system 500. For example, the functionality may be implemented in part on the computing device 502 as well as via the platform 522 that abstracts the functionality of the cloud 520.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
  a housing configured according to a mobile form factor;
  a display device disposed on a surface of the housing;
  one or more sensors disposed within the housing, the one or more sensors configured to produce an output that is usable to determine an orientation of the display device in one or more dimensions; and
  a rotation manager module disposed within the housing and configured to:
    process the output of the one or more sensors to determine the orientation of the display device, the processing occurring at a higher sampling rate responsive to a determination that the orientation of the display device has changed; and
    set a screen orientation of the display device based at least in part on variance of the determined orientation in relation to a threshold amount over a time interval.

2. A device as described in claim 1, wherein the one or more sensors include at least one of a three-dimensional (3D) accelerometer, a gyroscope, a distance sensor, or a camera.

3. A device as described in claim 1, wherein the screen orientation is set to one of a landscape orientation or a portrait orientation.

4. A device as described in claim 1, wherein the setting of the screen orientation by the rotation manager module is further configured to maintain the screen orientation without change when the screen orientation does not correspond to the determined orientation and the determined orientation varies more than the threshold amount over the time interval.

5. A device as described in claim 1, wherein the rotation manager module is further configured to change the screen orientation upon a determination that the screen orientation does not correspond to the determined orientation and the determined orientation varies less than the threshold amount over the time interval.

6. A device as described in claim 1, wherein the rotation manager module is further configured to determine whether the determined orientation varies less than the threshold amount by:
  computing a standard deviation for the orientation of the device determined at multiple points over the time interval; and
  comparing the standard deviation to the threshold amount.

7. A device as described in claim 1, wherein the rotation manager module is further configured to process the output of the one or more sensors to determine the orientation of the display device at the higher sampling rate responsive to a determination that the determined orientation varies more than the threshold amount over the time interval.

8. A device as described in claim 1, wherein the rotation manager module is further configured to process the output of the one or more sensors to determine the orientation of the display device over at least one additional time interval responsive to a determination that the determined orientation varies more than the threshold amount over the time interval.

9. A device as described in claim 8, wherein the rotation manager module is further configured to rotate the screen orientation when the screen orientation does not correspond to the determined orientation and the determined orientation varies less than the threshold amount over the at least one additional time interval.

10. A device as described in claim 8, wherein the rotation manager module is further configured to maintain the screen orientation when the screen orientation does not correspond to the determined orientation and the determined orientation varies more than the threshold amount over the at least one additional time interval.

11. A method comprising:
  detecting a change in orientation of a device using one or more sensors configured to produce output that is usable to determine the orientation of the device;
  collecting the output from the one or more sensors to determine the orientation of the device at multiple points over a time interval;
  computing an average orientation of the device and a variance of the orientation using the determined orientation corresponding to each of the multiple points over the time interval; and
  setting a screen orientation for displaying content on the device based on the average orientation of the device, including rotating the screen orientation when the screen orientation does not correspond to the average orientation of the device and the computed variance for the time interval is less than a threshold amount.

12. A method as described in claim 11, further comprising repeating the collecting, computing, and setting operations for at least one additional time interval when the computed variance for the time interval is greater than the threshold amount.

13. A method as described in claim 11, further comprising increasing a sampling rate at which output from the one or more sensors is collected responsive to detecting the change in orientation of the device.

14. A method as described in claim 13, further comprising decreasing the sampling rate from an increased sampling rate responsive to determining that the computed variance for the time interval is less than the threshold amount.

15. A method as described in claim 11, further comprising maintaining the screen orientation when the screen orientation does not correspond to the average orientation of the device and the computed variance for the time interval is greater than the threshold amount.

16. A method as described in claim 11, wherein the time interval is 250 milliseconds.

17. A system comprising:
  one or more processors; and
  one or more computer-readable storage media storing instructions thereon that are executable on a computing device to implement a rotation manager module configured to perform operations comprising:
  receiving multiple points of orientation data for a device that are derived from output of one or more sensors and correspond to a time interval;
  computing an average orientation of the device and a variance of the orientation over the time interval using the multiple points of orientation data; and
  changing a current screen orientation, with which content is to be displayed on the device, responsive to a determination that the current screen orientation does not correspond to the average orientation of the device and the variance computed for the time interval is less than a threshold amount, otherwise maintaining the current screen orientation.

18. A system as described in claim 17, wherein changing the current screen orientation includes skipping intermediate screen orientations between the current screen orientation and a screen orientation that corresponds to the average orientation of the device.

19. A system as described in claim 17, wherein:
  computing a variance of the orientation over the time interval includes computing a standard deviation of the multiple points of orientation data; and
  determining that the variance computed for the time interval is less than the threshold amount includes comparing the standard deviation of the multiple points of orientation data to the threshold amount.

* * * * *